US012206469B2

(12) United States Patent
You et al.

(10) Patent No.: US 12,206,469 B2
(45) Date of Patent: Jan. 21, 2025

(54) NEAR-FIELD BROADBAND UPLINK MIMO TRANSMISSION METHOD ASSISTED BY DYNAMIC METASURFACE ANTENNA

(71) Applicant: SOUTHEAST UNIVERSITY, Nanjing (CN)

(72) Inventors: Li You, Nanjing (CN); Jie Xu, Nanjing (CN); Mengyu Qian, Nanjing (CN); Kelin Huang, Nanjing (CN); Yuqi Ye, Nanjing (CN); Wenjin Wang, Nanjing (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 17/925,505

(22) PCT Filed: Feb. 21, 2022

(86) PCT No.: PCT/CN2022/077110
§ 371 (c)(1),
(2) Date: Nov. 15, 2022

(87) PCT Pub. No.: WO2023/123637
PCT Pub. Date: Jul. 6, 2023

(65) Prior Publication Data
US 2024/0243778 A1    Jul. 18, 2024

(30) Foreign Application Priority Data
Dec. 28, 2021 (CN) .......................... 202111625469.0

(51) Int. Cl.
*H04B 7/04* (2017.01)
*H01Q 15/00* (2006.01)
*H04B 7/0413* (2017.01)

(52) U.S. Cl.
CPC ..... H04B 7/04013 (2023.05); H01Q 15/0086 (2013.01); H04B 7/0413 (2013.01)

(58) Field of Classification Search
CPC ... H04W 24/02; H04W 52/14; H04W 52/143; H04W 52/146; H04W 52/52;
(Continued)

(56) References Cited

U.S. PATENT DOCUMENTS 11,451,287 B1 * 9/2022 Sivaprakasam ...... H04B 7/0617
11,601,192 B2 * 3/2023 Esfahlani ................ H01Q 3/44
(Continued)

FOREIGN PATENT DOCUMENTS

| CN | 113285742 A | 8/2021 |
| CN | 113395095 A | 9/2021 |

(Continued)

OTHER PUBLICATIONS

Mehmet, Ali Aygul et al., Deep Learning-Based Optimal RIS Interaction Exploiting Previously Sampled Channel Correlations, Apr. 1, 2021, 6 pages, 2021 IEEE Wireless Communications and Networking Conference (WCNC).

*Primary Examiner* — Eva Y Puente
(74) *Attorney, Agent, or Firm* — MUNCY, GEISSLER, OLDS & LOWE, P.C.

(57) ABSTRACT

The present invention discloses a near-field broadband uplink MIMO transmission method assisted by a dynamic metasurface antenna. The method includes: Broadband signals sent by a plurality of users distributed in a near-field region are processed with a large-size dynamic metasurface antenna as a receive antenna on a base station side, which can reduce system hardware costs and power consumption; and compared with the current hybrid beamforming based on a phase shifter and a conventional antenna, hybrid beamforming based on the dynamic metasurface antenna (Continued)

can effectively improve transmission performance. The present invention proposes an algorithm framework jointly designing a dynamic metasurface antenna and a baseband beamformer and including method such as matrix-weighted mean square error sum (MWMSE) minimization, alternate optimization, matrix vectorization, and MM. The present invention implements near-field broadband large-scale MIMO uplink transmission assisted by a dynamic metasurface antenna with low algorithm complexity and good convergence.

10 Claims, 3 Drawing Sheets

(58) Field of Classification Search
CPC ..... H04W 16/28; H04W 28/08; H04W 40/06; H04W 72/23; H01Q 1/364; H01Q 15/0086; H01Q 1/52; H01Q 21/065; H01Q 3/44; H01Q 19/067; H01Q 1/42; H01Q 3/46; H01Q 3/443; H01Q 9/04; H04L 25/0204; H04L 25/03343; H04L 1/0026; H04L 5/0023; H04L 2025/03426; H04L 1/06; H04L 25/0224; H04L 5/0048
USPC ........................................................ 375/262
See application file for complete search history.

(56) References Cited

U.S. PATENT DOCUMENTS

| | | | |
|---|---|---|---|
| 2019/0103665 A1* | 4/2019 | Yoo | ............... H01Q 1/364 |
| 2022/0399651 A1* | 12/2022 | Sleasman | ........... H01Q 21/0012 |
| 2023/0187824 A1* | 6/2023 | Zeeshan | ............ H01Q 21/0025 343/702 |

FOREIGN PATENT DOCUMENTS

| | | |
|---|---|---|
| JP | 2014140151 A | 7/2014 |
| WO | WO2021207748 A2 | 10/2021 |

* cited by examiner

NEAR-FIELD BROADBAND UPLINK MIMO TRANSMISSION METHOD ASSISTED BY DYNAMIC METASURFACE ANTENNA

TECHNICAL FIELD

The present invention relates to the field of large-scale MIMO wireless communication, and in particular, to a near-field broadband uplink MIMO transmission method assisted by a dynamic metasurface antenna.

BACKGROUND

A dynamic metasurface antenna is a brand-new wireless communication antenna paradigm, whose core technology is the tunable metamaterial element. The dynamic metasurface antenna can adjust its own permittivity and permeability in real time according to obtained channel state information to present a series of ideal beamforming characteristics. The dynamic metasurface antennas can capture signals from a channel, process the signals in an analog domain, and transmit the signals along the waveguides to a digital processor. Correspondingly, the dynamic metasurface antenna can also radiate signals generated by the signal source.

The dynamic metasurface antenna, with the advantages of low power consumption, high energy efficiency, low costs, small size and light weight, can quite well solve problems caused by implementing large-scale MIMO with an existing hybrid beamforming technology, such as sharp increase of transmission power consumption, high hardware costs, and limited laying area, and therefore has great potential. All existing work focuses on far-field narrow band communication transmission optimization based on a dynamic metasurface antenna. Near-field broadband transmission based on a dynamic metasurface antenna is rarely explored.

SUMMARY

In view of this, an objective of the present invention is to provide a near-field broadband uplink MIMO transmission method assisted by a dynamic metasurface antenna. In the method, by designing a baseband beamforming matrix and a weight matrix of a dynamic metasurface antenna on a base station side, system transmission performance can be effectively improved, and implementation complexity can be reduced.

To achieve the foregoing objective, the present invention uses the following technical solution:

A near-field broadband uplink MIMO transmission method assisted by a dynamic metasurface antenna, where in the method, a sum rate maximization problem is constructed based on a broadband large-scale MIMO uplink single-cell system and a channel model that considers a near-field effect, frequency-selective fading, and a spatial broadband effect, and the sum rate maximization problem is solved in a manner of jointly designing a baseband beamforming matrix and a weight matrix of a dynamic metasurface antenna, to maximize a near-field broadband large-scale MIMO uplink sum rate; and the transmission method includes:

step S1, giving a weight matrix of a dynamic metasurface antenna, and solving, based on MWMSE transformation, a baseband beamforming matrix on each subcarrier according to a system sum rate maximization criterion;

step S2, giving a baseband beamforming matrix, and solving, based on matrix vectorization, an MM method, and a convex optimization method, a weight matrix of a dynamic metasurface antenna according to the system sum rate maximization criterion; and step S3, cyclically performing step S1 and step S2 until a difference between two adjacent system sum rates is less than a given threshold, where in a moving process of users, as state information of a channel from each user to the base station is changed, the near-field broadband uplink MIMO transmission method assisted by a dynamic metasurface antenna is dynamically implemented.

Further, a specific expression of the channel model that considers the near-field effect, the frequency-selective fading, and the spatial broadband effect is:

$$g_u(f) = \sum_{p=0}^{P_u} a_{u,p}(f) \odot b_{u,p}(f) \qquad (1)$$

in the expression (1), $$a_{u,p}(f) = \left[ \sqrt{\xi_{1,1,u,p}} A_{1,1,u,p}(f), \sqrt{\xi_{1,2,u,p}} A_{1,2,u,p}(f), \ldots, \sqrt{\xi_{M,L,u,p}} A_{M,L,u,p}(f) \right] \qquad (2)$$

$$b_{u,p}(f) = \left[ e^{-j2\pi(f+f_c)\frac{|p_{u,p}-p_{1,1}|}{c}}, e^{-j2\pi(f+f_c)\frac{|p_{u,p}-p_{1,2}|}{c}}, \ldots, e^{-j2\pi(f+f_c)\frac{|p_{u,p}-p_{M,L}|}{c}} \right] \qquad (3)$$

where $a_{u,p}(f)$ and $b_{u,p}(f)$ represent a channel gain that considers a near-field effect, frequency selectivity, and a spatial broadband effect and a response matrix of an antenna array respectively; $\xi_{m,l,u,p}$ and $A_{m,l,u,p}(f)$ represent a large-scale fading factor of a $(p)^{th}$ transmission path between a $(l)^{th}$ metamaterial on a $(m)^{th}$ microstrip of a base station antenna and a user u and a channel gain coefficient respectively, $p_{u,p}$ and $p_{m,l}$ represent a scatterer position of the $(p)^{th}$ transmission path between the user u and the base station and a position of the $(l)^{th}$ metamaterial on the $(m)^{th}$ microstrip of the base station antenna respectively, $f$ and $f_c$ represent a frequency and a center frequency respectively, and C represents a signal transmission speed equal to $3 \times 10^8$;

the channel gain coefficient is expressed as:

$$A_{m,l,u,p}(f) = |\Gamma_{u,p}(f)| \sqrt{F(\Theta_{m,l,u,p})} \frac{c}{4\pi(f+f_c)\|p_{u,p}-p_{m,l}\|_F} \qquad (4)$$

in the expression (4), $\Theta_{m,l,u,p} = (\theta_{m,l,u,p}, \phi_{m,l,u,p})$ represents height-azimuth of a signal reflected from the user u by a $(p)^{th}$ reflector and reaching a $(l)^{th}$ antenna unit on the $(m)^{th}$ microstrip of the base station antenna, and $F(\Theta_{m,l,u,p})$ is expressed as:

$$F(\Theta_{m,l,u,p}) = \begin{cases} 6\cos^2(\theta_{m,l,u,p}), & \theta_{m,l,u,p} \in \left[0, \frac{\pi}{2}\right] \\ 0, & \text{otherwise} \end{cases} \qquad (5)$$

$\Gamma_{u,p}(f)$ refers to a reflection coefficient of a reflector on a $(p)^{th}$ path of the user u, and is expressed as:

$$\Gamma_{u,p}(f) = \tag{6}$$

$$\begin{cases} \dfrac{\cos\phi_{i,u,p} - n_t\cos\phi_{t,u,p}}{\cos\phi_{i,u,p} + n_t\cos\phi_{t,u,p}} e^{-\left(\dfrac{8\pi^2(f+f_c)^2\sigma_{rough}^2\cos^2\phi_{i,u,p}}{c^2}\right)}, & p = 1, 2, \ldots, P \\ 1, & p = 0 \end{cases}$$

in the expression (6), $n_t$ is a refractive index, $\sigma_{rough}^2$ is a roughness coefficient of a reflection surface, and $\cos\phi_{i,u,p}$ and $\cos\phi_{t,u,p}$ are an incident angle and a reflection angle of the signal of the user u on a $(p)^{th}$ reflection object respectively.

Further, the sum rate maximization problem is defined as a first optimization problem, and a specific expression of the problem is:

$$\mathcal{P}_1: \max_{Q, W_s, \forall s \in \{1,2,\ldots,S\}} \sum_{s=0}^{S-1} \Delta_B \log \left| I_U + \frac{P_t}{\Delta_B \sigma^2} W_s^H Q H_s G_s G_s^H H_s^H Q^H W_s (W_s^H Q H_s H_s^H Q^H W_s)^{-1} \right| \tag{7}$$

$$\text{s.t. } (Q)_{m_1,(m_2-1)L+1} = \begin{cases} q_{m_1,l}, & m_1 = m_2 \\ 0, & m_1 \neq m_2 \end{cases}, q_{m_1,l} \in \mathbb{Q}, \forall m_1, l$$

in the expression (7), a target function is a sum rate of a broadband large-scale MIMO uplink system based on a dynamic metasurface antenna, S represents a quantity of subcarriers, and $\Delta_B$ represents a subcarrier spacing and is expressed as a ratio of a bandwidth B to the quantity of subcarriers S; $I_U$ is an identity matrix of U×U, $\sigma^2$ is a variance of noise, $P_t$ represents a transmit power, and U is a quantity of users in a cell; $G_s=[g_{1,s}, g_{2,s}, \ldots, g_{U,s}] \in \mathbb{C}^{N_R \times U}$ represents a channel matrix of an $(s)^{th}$ subcarrier, $W_s \in \mathbb{C}^{M \times U}$ represents a baseband beamformer of the $(s)^{th}$ subcarrier, $H_s \in \mathbb{C}^{N_R \times N_R}$ describes a frequency-selective effect of a signal propagated on a microwave transmission band, and $Q \in \mathbb{C}^{M \times N_R}$ represents a weight matrix of a dynamic metasurface antenna; and log is a logarithm operation, and $|\cdot|$ is a matrix determinant obtaining operation.

Further, the step S1 specifically includes:

step S101, obtaining an equivalent mean square error sum minimization problem of sum rate maximization with MWMSE transformation:

$$\min_{M_s, W_s, \forall s \in \{1,2,\ldots,S\}} \sum_{s=0}^{S-1} tr\{M_s E_s(Q, W_s)\} - \log_2|M_s| \tag{8}$$

in the expression (8), $E_s(Q, W_s)$ is a mean square error sum matrix, whose specific expression is:

$$E_s(Q, W_s) = \tag{9}$$
$$P_t(W_s^H Q H_s G_s - I_U)(W_s^H Q H_s G_s - I_U)^H + \Delta_B \sigma^2 W_s^H Q H_s H_s^H Q^H W_s$$

$M_s$ is a weighted auxiliary matrix and is obtained from an expression (10), whose expression is:

$$M_s^{opt} = E_s(Q, W_s)^{-1} \tag{10}$$

step S102, optimizing a baseband beamforming matrix on each subcarrier when a weight matrix of a dynamic metasurface antenna is given, to obtain a system sum rate optimization problem based on MWMSE transformation, where the problem is defined as a second optimization problem, and a specific expression of the second optimization problem is:

$$\mathcal{P}_2: \min_{W_s, \forall s \in \{1,2,\ldots,S\}} \sum_{s=0}^{S-1} tr\{M_s E_s(Q, W_s)\} - \log_2|M_s| \tag{11}$$

when $E_s(Q, W_s)$ and $M_s$ are given, $W_s$ is given by the following expression, where $\forall s \in \{1, 2, \ldots, S\}$:

$$W_s^{opt} = \left(P_t Q H_s G_s G_s^H H_s^H Q^H + \Delta_B \sigma^2 Q H_s H_s^H Q^H\right)^{-1} Q H_s G_s \tag{12}$$

step S103, iteratively updating the mean square error sum matrix $E_s(Q,W_s)$, the weighted auxiliary matrix $M_s$, and the baseband beamforming matrix $W_s$, where $\forall s \in \{1, 2, \ldots, S\}$, to obtain a baseband beamforming matrix meeting that a difference between adjacent two iteration results is less than a given threshold as a solution of a baseband beamforming matrix whose system sum rate is maximized when a weight matrix of a dynamic metasurface antenna is given.

Further, the step S2 specifically includes:

step S201, obtaining, when a baseband beamforming matrix is given, a problem of optimizing a weight matrix of a dynamic metasurface antenna to maximize a system sum rate, and obtaining an equivalent mean square error sum minimization problem with MWMSE transformation, where the problem is defined as a third optimization problem, whose specific expression is:

$$\mathcal{P}_3: \min_Q \sum_{s=0}^{S-1} tr\{P_t M_s W_s^H Q H_s G_s G_s^H H_s^H Q^H W_s\} - tr\{P_t M_s W_s^H Q H_s G_s\} - \tag{13a}$$
$$tr\{P_t M_s G_s^H H_s^H Q^H W_s\} + tr\{\Delta_B \sigma^2 M_s W_s^H Q H_s Q^H W_s\}$$

$$\text{s.t. } (Q)_{m_1,(m_2-1)L+l} = \begin{cases} q_{m_1,l}, & m_1 = m_2 \\ 0, & m_1 \neq m_2 \end{cases}, \tag{13b}$$

$$q_{m_1,l} \in \mathbb{Q}, \forall m_1, l \tag{13c}$$

step S202, removing a physical structure constraint of a dynamic metasurface antenna, that is, the expression (13b) with a matrix vectorization method, to obtain a problem of maximizing an equivalent expression of a system sum rate having only a weight feasible domain constraint of the dynamic metasurface antenna, where the problem is defined as a fourth optimization problem;

step S203, designing a weight of the dynamic metasurface antenna with an MM algorithm and a convex optimization algorithm in consideration of four weight feasible domain constraints; and step S204, iteratively updating the mean square error sum matrix $E_s(Q,W_s)$, the weighted auxiliary matrix $M_s$, and the weight matrix Q of the dynamic metasurface antenna, to obtain a weight matrix meeting that a difference between adjacent two iteration results is less than a given threshold as a solution of the weight matrix of the dynamic metasurface antenna whose system sum rate is maximized when a baseband beamforming matrix is given.

Further, the step S202 specifically includes:

step S2021, pulling the matrix Q into $q=[q_{1,1}, q_{1,2}, \ldots, q_{m,(m-1)L+l}, \ldots, q_{M,ML}]^T$, where $q_{m,(m-1)Z+l}$ represents an element of a $(m)^{th}$ row and a $(l)^{th}$ column of the matrix Q;

step S2022, obtaining the following with a matrix vectorization rule:

$$tr\{QC_s\} = q^T c_s, \text{ and } tr\{Q^H C_s^H\} = c_s^H q \quad (14a)$$

$$tr\{Q^H B_s Q A_s\} = q^H (B_s \otimes N_L) \odot A_s^T q \quad (14b)$$

$$tr\{Q^H B_s Q D_s\} = q^H (\tilde{B}_s \otimes I_L) \odot D_s q \quad (14c)$$

in the expressions (14a) to (14c), $A_s = H_s G_s G_s^H H_s^H$, $B_s = W_s M_s W_s^H$, $C_s = H_s G_s M_s W_s^H$, and $D_s = H_s H_s^H$; L represents a quantity of metasurface units on each microwave transmission band, $N_L$ is an all 1's matrix of L×L, $I_L$ is an identity matrix of L×L, $\tilde{B}_s$ is a diagonal matrix, and $(\tilde{B}_s)_{m,m} = (B_s)_{m,m}$; and $c_s = [(C_s)_{1,1}, (C_s)_{2,1}, \ldots, (C_s)_{(m-1)L+l,m}, \ldots, (C_s)_{ML,M}]^T$; and step S2023, performing matrix vectorization transformation, where the fourth optimization problem is specifically expressed as:

$$\mathcal{P}_4: \min_q q^H S q - 2 \operatorname{Re}\{q^H c^*\} \quad (15a)$$

$$\text{s.t. } q_{m_1,l} \in \mathbb{Q}, \forall m_1, l \quad (15b)$$

in the expression (15a), $$S = \sum_{s=0}^{S-1} P_t(B_s \otimes N_L) \odot A_s^T + \Delta_B \sigma^2 (\tilde{B}_s \otimes I_L) \odot D_s, \text{ and } c = \sum_{s=0}^{S-1} P_t c_s.$$

Further, the step S203 specifically includes:

step S2031, considering four weight feasible domain constraints, including: an unconstrained weight, an amplitude weight, a binary amplitude weight, and a Lorentzian constraint phase weight;

step S2032, for the unconstrained weight and the amplitude weight, expressing problems of optimizing a weight vector of the dynamic metasurface antenna to maximize the system sum rate as $\mathcal{P}_5$ and $\mathcal{P}_6$ respectively, where the problem $\mathcal{P}_5$ and the problem $\mathcal{P}_6$ are specifically expressed as:

$$\mathcal{P}_5: \min_q q^H S q - 2 \operatorname{Re}\{c^T q\} \quad (16)$$

$$\mathcal{P}_6: \min_q q^T S q - 2 \operatorname{Re}\{c^T\} q \quad (17a)$$

$$\text{s.t. } q_{m_1,l} \in [a, b], b > a > 0, \forall m_1, l \quad (17b)$$

where the problem $\mathcal{P}_5$ and the problem $\mathcal{P}_6$ are convex problems and solved through the convex optimization algorithm;

step S2033, for the binary amplitude weight, expressing a problem of optimizing a weight vector of the dynamic metasurface antenna to maximize the system sum rate as $\mathcal{P}_7$, where the problem $\mathcal{P}_7$ is specifically expressed as:

$$\mathcal{P}_7: \min_q q^T S q - 2 \operatorname{Re}\{c^T\} q \quad (18a)$$

$$\text{s.t. } q_{m_1,l} \in c \cdot \{0, 1\}, c > 0, \forall m_1, l \quad (18b)$$

where the problem $\mathcal{P}_7$ is solved through a brute-force search method; and step S2034, for the Lorentzian constraint phase weight, expressing a problem of optimizing a weight vector of the dynamic metasurface antenna to maximize the system sum rate as $\mathcal{P}_8$, where the problem $\mathcal{P}_8$ is specifically expressed as:

$$\mathcal{P}_8: \min_q q^H S q - 2 \operatorname{Re}\{c^T q\} \quad (19a)$$

$$\text{s.t. } q_{m_1,l} \in \left\{ \frac{\mathcal{J} + e^{\mathcal{J}\phi}}{2} \bigg| \phi \in [0, 2\pi] \right\}, \forall m_1, l \quad (19b)$$

where $\mathcal{J}$ represents an imaginary unit; and solving the problem $\mathcal{P}_8$ through the MM algorithm.

Further, the solving the problem $\mathcal{P}_8$ through the MM algorithm specifically includes the following steps:

step S20341, expressing the weight vector of the dynamic metasurface antenna as $$q = \frac{1}{2}(\mathcal{J} 1_{N_R} + p),$$

where $1_{N_R}$ is an all 1's vector, and $$p = [e^{\mathcal{J}\phi_1}, e^{\mathcal{J}\phi_2}, \ldots, e^{\mathcal{J}\phi_{N_R}}]^T;$$

and step S20342, finding a tractable asymptotic function, whose expression is:

$$p^H S p \leq p^H T p - 2 \operatorname{Re}\{p^H (T-S) \mathbf{p}^{(\ell)}\} + (\mathbf{p}^{(\ell)})^H (T-S) \mathbf{p}^{(\ell)} \quad (20)$$

$T = \lambda_{max} I$, where $\lambda_{max}$ is a maximum eigenvalue of S; and therefore, the problem $\mathcal{P}_8$ is transformed into:

$$\mathcal{P}_9^{(\ell)}: \max_p \mathrm{Re}\{p^H a^{(\ell)}\} \tag{21a}$$

$$\text{s.t. } p_n \in \{e^{j\phi} \mid \phi \in [0, 2\pi]\}, \forall n \tag{21b}$$

where $a^{(\ell)} = (\lambda_{max} I_{N_R} - S) p^{(\ell)} + 2c^* - j S1_{N_R}$; and solving the problem $\mathcal{P}_9^{(\ell)}$ by alternately optimizing the vectors a and p.

Further, the solving the problem $\mathcal{P}_9^{(\ell)}$ by alternately optimizing the vectors a and p specifically includes:

first, initializing $p^{(\ell_1)}$ and $a^{(\ell_1)}$, and setting an iteration index $\ell_1 = 0$ and a threshold $\xi_1$;

then, giving $a^{(\ell_1)}$, and calculating $p_n^{(\ell_1+1)} = e^{j \arg a_n^{(\ell_1)}}$ and $\forall n$;

then, giving $p^{(\ell_1+1)}$, and calculating $a^{(\ell_1+1)} = (\lambda_{max} I_{N_R} - S) p^{(\ell_1+1)} + 2c^* - j S1_{N_R}$; and finally, calculating the system sum rate $R_S^{(\ell_1+1)}$, and if a difference between the $(\ell_1)^{th}$ system sum rate $R_S^{(\ell_1)}$ and the $(\ell_1+1)^{th}$ system sum rate $R_S^{(\ell_1+1)}$ is less than the given threshold $\xi_1$, jumping out of the loop, using $p^{(\ell_1+1)}$ as a solution meeting the Lorentzian constraint phase weight under the system sum rate maximization criterion when the baseband beamforming matrix is given; otherwise $\ell_1 = \ell_1 + 1$, and performing the previous three steps again.

Further, the step S3 specifically includes:

step S301, initializing a baseband beamforming matrix $W_s^{(0)}$, where $\forall s \in \{1, 2, \ldots, S\}$, a weight matrix $Q^{(0)}$ of the dynamic metasurface antenna, a weighted auxiliary matrix $M^{(0)}$, and a system sum rate $R_S^{(0)}$, where a quantity of iteration times is $\ell_2 = 0$, and a threshold is $\xi_2$;

step S302, giving a weight matrix $Q^{(\ell_2)}$ of the dynamic metasurface antenna, and solving a baseband beamforming matrix $W_s^{(\ell_2+1)}$ according to the expression (12), where $\forall s \in \{1, 2, \ldots, S\}$;

step S303, giving $Q^{(\ell_2)}$ and the baseband beamforming matrix $W_s^{(\ell_2+1)}$, where $\forall s \in \{1, 2, \ldots, S\}$, and calculating a mean square error sum matrix $E_s(Q, W_s)^{(\ell_2+1)}$ according to the expression (9), where $s \in \{1, 2, \ldots, S\}$;

step S304, giving the mean square error sum matrix $E_s(Q, W_s)^{(\ell_2+1)}$, where $\forall s \in \{1, 2, \ldots, S\}$, and calculating a weighted auxiliary matrix $M_s^{(\ell_2+1)}$ according to the expression (10), where $\forall s \in \{1, 2, \ldots, S\}$;

step S305, giving $W_s^{(\ell_2+1)}$ and $M_s^{(\ell_2+1)}$, where $\forall s \in \{1, 2, \ldots, S\}$, and solving weight matrices $Q^{(\ell_2+1)}$ of four dynamic metasurface antennas according to the expressions (16) to (21) respectively; and step S306, calculating a system sum rate $R_S^{(\ell_2+1)}$, and if $|R_S^{(\ell_2+1)} - R_S^{(\ell_2)}| \leq \xi_2$ holds, jumping out of the loop, and using ($W_s^{(\ell_2+1)}$, $Q^{(\ell_2+1)}$), where $\forall s \in \{1, 2, \ldots, S\}$, as a solution meeting the baseband beamforming matrix under the system sum rate maximization criterion and the weight matrix of the dynamic metasurface antenna: otherwise $\ell_2 = \ell_2 + 1$, and performing step S302 to step S306 again.

The advantageous effects of the present invention are as follows:

1. Compared with a conventional antenna, the dynamic metasurface antenna is characterized by low power consumption, low circuit complexity, low hardware costs and small array size, and is hopefully used in a future communication network architecture to implement a large-scale antenna array.

2. Compared with a hybrid beamforming technology based on a conventional antenna, the beamforming technology assisted by the dynamic metasurface antenna does not require additional hardware devices (for example, a phase shifter), so that benefits such as low power consumption, high energy efficiency, and low costs are brought.

3. Compared with a conventional communication model without considering the near-field or broadband effect, consideration of the near-field and broadband effects can notably improve sum rate performance of the system assisted by the dynamic metasurface antenna.

4. The near-field broadband uplink MIMO transmission method assisted by a dynamic metasurface antenna proposed in the present invention includes methods such as alternate optimization, MWMSE transformation, matrix vectorization and MM, can complete joint design of a baseband beamforming matrix on a base station side and a weight matrix of a dynamic metasurface antenna, and has relatively good convergence and relatively low algorithm complexity.

DETAILED DESCRIPTION

In order to make the objectives, technical solutions, and advantages of the embodiments of the present invention clearer, the technical solutions in the embodiments of the present invention will be clearly and completely described with reference to the accompanying drawings in the embodiments of the present invention. Obviously, it is a part of the embodiments of the present invention, but not all the embodiments. Based on the embodiments of the present invention, all other embodiments obtained by a person of ordinary skill in the art without creative efforts shall fall within the protection scope of the present invention.

Embodiment 1

Figure 1:
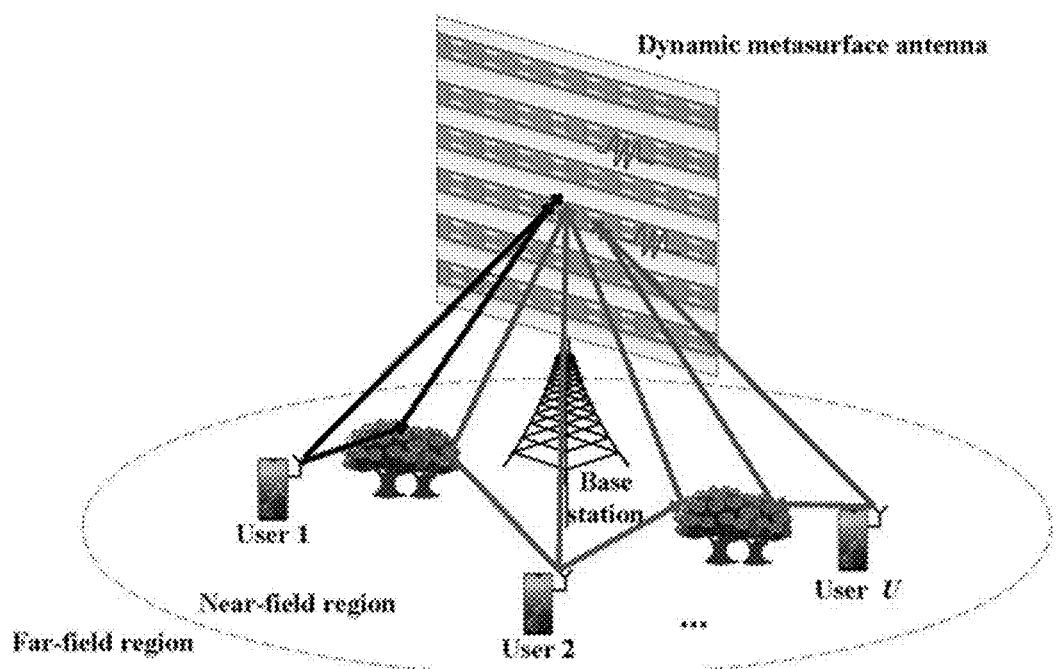
FIG. 1 is a schematic diagram of near-field broadband large-scale MIMO uplink communication assisted by a dynamic metasurface antenna according to Embodiment 1.
Figure 2:
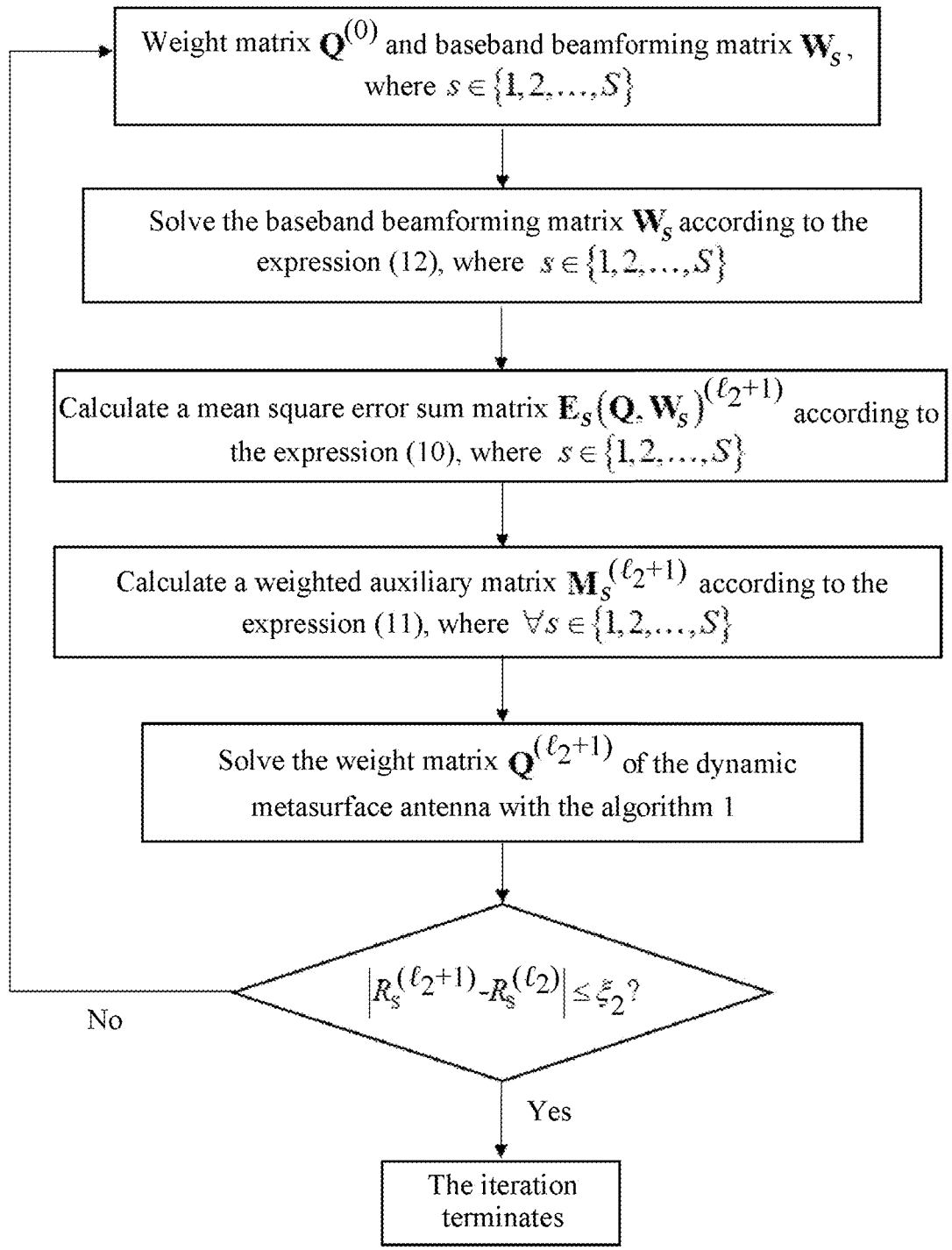
FIG. 2 is a flowchart of an algorithm of near-field broadband uplink transmission assisted by a dynamic metasurface antenna based on an alternate optimization method and with system sum rate maximization as a criterion according to Embodiment 1.
Figure 3:
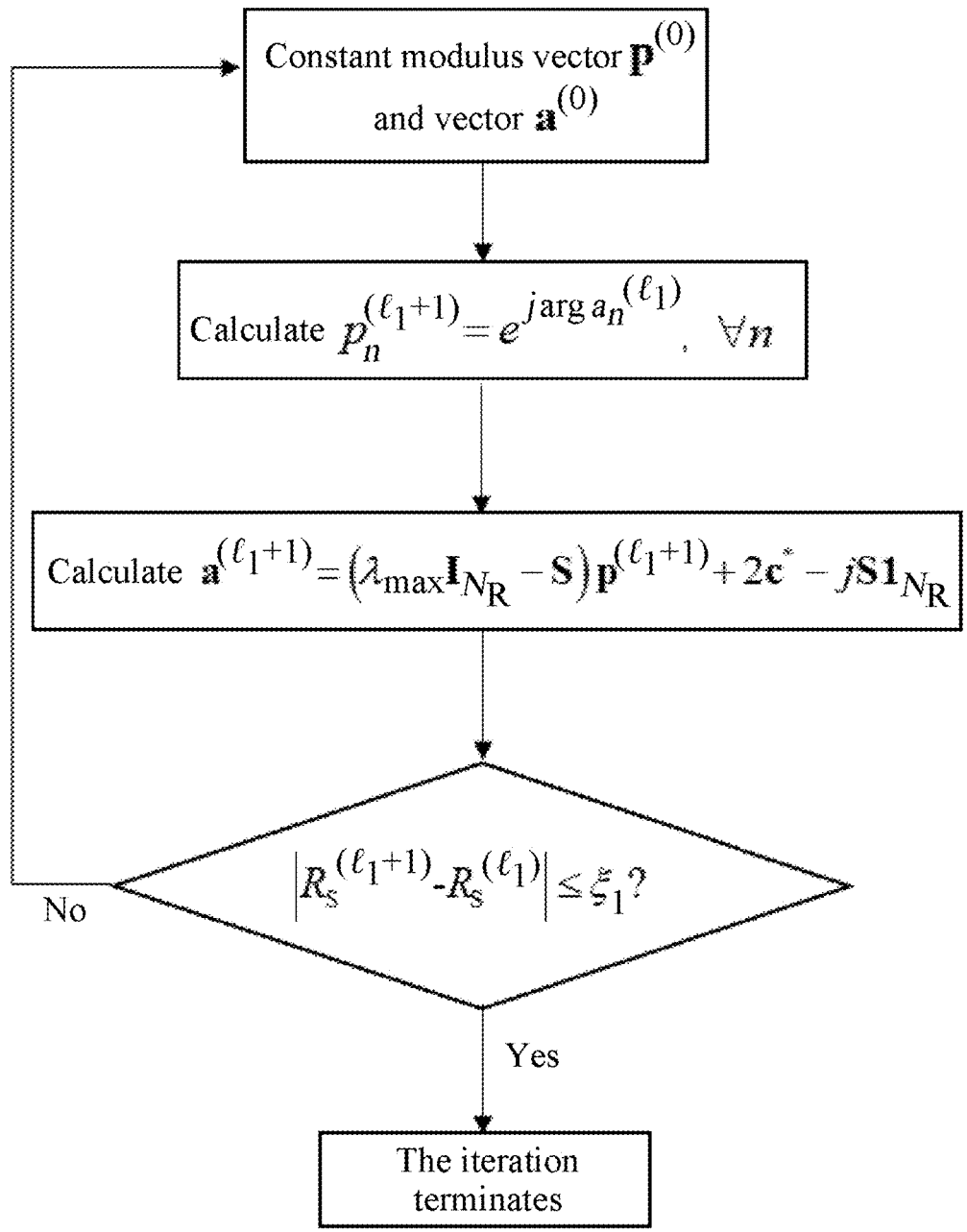
FIG. 3 is a flowchart of a Lorentzian constraint phase weight algorithm based on an MM method according to Embodiment 1.

Referring to FIG. 1 to FIG. 3, this embodiment provides a near-field broadband uplink MIMO transmission method assisted by a dynamic metasurface antenna. In the method, the dynamic metasurface antenna is arranged on a base station side and configured to observe and capture signals from a channel. In the uplink transmission method, with system sum rate maximization as a criterion, based on methods such as MWMSE minimization, alternate optimization, matrix vectorization and MM, a baseband beamformer and a weight matrix of the dynamic metasurface antenna are determined, and formation of signal beams is completed, thereby improving transmission performance.

As channel state information in a communication system is changed, the base station side repeats the foregoing steps according to updated channel state information, to perform the near-field broadband uplink MIMO transmission method assisted by a dynamic metasurface antenna, thereby dynamically updating the transmission process, so as to ensure transmission performance.

Specifically, in this embodiment, the foregoing "MWMSE minimization" specifically includes:

A process of solving a sum rate expression of a near-field broadband uplink transmission system is relatively complex, so that in this embodiment, an original sum rate maximization problem is transformed into a mean square error sum minimization problem with MWMSE transformation, and a weighted auxiliary matrix is introduced based on original variables to reduce complexity of transmission optimization.

Specifically, in this embodiment, the foregoing "alternate optimization method" includes: for the weight matrix of the dynamic metasurface antenna and the weighted auxiliary matrix that are given, a baseband beamforming matrix is obtained with a closed-form solution; for the weight matrix of the dynamic metasurface antenna and the baseband beamforming matrix that are given, the weighted auxiliary matrix is obtained with a closed-form solution:

for the baseband beamforming matrix and the weighted auxiliary matrix that are given, the weight matrix of the dynamic metasurface antenna is designed with mean square error sum minimization as a criterion and with methods such as matrix vectorization and MM; and joint optimization of the baseband beamforming matrix and the weight matrix of the dynamic metasurface antenna is alternately implemented until a difference between two adjacent system sum rates is less than a given threshold.

More specifically, in this embodiment, the foregoing "designing the weight matrix of the dynamic metasurface antenna with mean square error sum minimization as a criterion and with methods such as matrix vectorization and MM" specifically includes the following steps:

Terms in the optimization problem that are unrelated to the weight matrix and that may be considered as constants are neglected, to obtain a simplified mean square error sum minimization problem:

a target function is transformed into a matrix tracing form through MWMSE transformation, and the matrix tracing form may be transformed into a vector multiplication form with the matrix vectorization method, where the transformation may eliminate a block structure of the weight matrix of the dynamic metasurface antenna in the mean square error sum minimization problem, to reduce problem solving complexity; and solving of a weight vector of the dynamic metasurface antenna in four weight feasible domains is considered, and the four feasible domains are an unconstrained (complex plane) weight, an amplitude weight, a binary amplitude weight and a Lorentzian phase constraint weight respectively, where for such two feasible domains as the unconstrained (complex plane) weight and the amplitude weight, the weight vector is solved with a common convex optimization algorithm;

for such a feasible domain as the binary amplitude weight, the weight vector is solved with brute-force search; and for such a feasible domain as the Lorentzian phase constraint weight, the weight vector is solved with an MM method.

More specifically, in this embodiment, the foregoing "solving the weight vector with an MM method" specifically includes:

through the matrix vectorization method, an optimization variable is simplified from the weight matrix of the dynamic metasurface antenna into the weight vector, and the target function is simplified from matrix optimization into vector optimization;

when a weighted auxiliary variable introduced by MWMSE transformation and the baseband beamforming matrix are considered as constants to solve the weight vector of the dynamic metasurface antenna, the target function is a non-convex function of the weight vector and iteratively solved with the MM method;

in each time of iteration, a target function is replaced with its upper bounding function, a closed expression of an upper bounding problem is given, a target function in the next time of iteration is updated with this solution, a value of the original target function is calculated, and the iteration terminates when a difference between target functions in adjacent two times of iteration is less than a given threshold; and after the termination, the weight vector is changed again into a matrix as a solution to the mean square error sum minimization problem when the baseband beamforming matrix and the weighted auxiliary variable are given.

In this embodiment, to describe the transmission method more clearly and in more detail, the transmission method is specifically described with a specific application scenario and includes:

(1) A sum rate maximization problem is constructed based on a broadband large-scale MIMO uplink single-cell system and a channel model that considers a near-field effect, frequency-selective fading, and a spatial broadband effect, and the problem is defined as a first optimization problem, where a dynamic metasurface antenna array is used on a base station side of the broadband large-scale MIMO uplink single-cell system, and the first optimization problem is solved in a manner of jointly designing a baseband beamforming matrix and a weight matrix of a dynamic metasurface antenna, to maximize a near-field broadband large-scale MIMO uplink sum rate, where the step specifically includes:

As shown in FIG. 1, the method is based on a broadband large-scale MIMO uplink single-cell system, the system includes a plurality of single-antenna users and one base station, and a dynamic metasurface antenna array is used on a base station side as a signal receive antenna. The array is formed by M microwave transmission bands, and L metasurface units are mounted on each microwave transmission band. Therefore, the dynamic metasurface antenna array is formed by a total of $N_R \triangleq ML$, a cell includes U single-antenna users, a set of user is $\mathcal{U} \triangleq \{1, 2, \cdots, U\}$, and $N_u$ antennas are configured for each user.

$Q \in \mathbb{C}^{M \times N_R}$ represents a weight matrix of a dynamic metasurface antenna, whose expression is:

$$(Q)_{m_1,(m_2-1)L+l} = \begin{cases} q_{m_1,l}, & m_1 = m_2 \\ 0, & m_1 \neq m_2 \end{cases} \quad (1)$$

In the expression (1), $m_1 \in \{1, 2, \cdots, M\}$, $m_2 \in \{1, 2, \cdots, M\}$, $l \in \{1, 2, \cdots, L\}$, and $q_{m_1,l}$ represents a gain of a $(l)^{th}$ antenna unit on a $(m)^{th}$ microwave transmission band for a signal, that is, a change for a signal amplitude or phase. Specifically, metamaterial units may be considered as a resonance circuit, a change of the units for a signal may be modeled into a weight multiplier of an amplitude, a binary amplitude or a Lorentzian constraint phase, and a specific expression is:

amplitude: $q \in \mathbb{Q} = [a,b], b > a > 0$; and binary amplitude: $q \in \mathbb{Q} = c \cdot \{0,1\}, c > 0$; and Lorentzian constraint phase:

$$q \in \mathbb{Q} = \left\{ \frac{\mathcal{J} + e^{\mathcal{J}\phi}}{2} \,\middle|\, \phi \in [0, 2\pi] \right\};$$

and where $\mathcal{J}$ represents an imaginary unit.

Specifically, the near-field broadband uplink transmission system assisted by the dynamic metasurface antenna has characteristics such as large base station antenna array aperture, high signal carrier frequency, and large transmission bandwidth, these characteristics cause wireless communication to possibly occur in a near-field region of the base station, and meanwhile signal transmission is affected by frequency-selective fading and the spatial broadband effect. Therefore, the following channel model is introduced into this embodiment, and a specific expression is:

$$g_u(f) = \sum_{p=0}^{P_u} a_{u,p}(f) \odot b_{u,p}(f) \quad (2)$$

in the expression (2), $$a_{u,p}(f) = \left[ \sqrt{\xi_{1,1,u,p}} A_{1,1,u,p}(f), \right. \quad (3a)$$

$$\left. \sqrt{\xi_{1,2,u,p}} A_{1,2,u,p}(f), \ldots, \sqrt{\xi_{M,L,u,p}} A_{M,L,u,p}(f) \right]$$

$$b_{u,p}(f) = \begin{bmatrix} e^{-\mathcal{J}2\pi(f+f_c)\frac{|p_{u,p}-p_{1,1}|}{c}}, \\ e^{-\mathcal{J}2\pi(f+f_c)\frac{|p_{u,p}-p_{1,2}|}{c}}, \ldots, e^{-\mathcal{J}2\pi(f+f_c)\frac{|p_{u,p}-p_{M,L}|}{c}} \end{bmatrix} \quad (3b)$$

where $a_{u,p}(f)$ and $b_{u,p}(f)$ represent a channel gain that considers a near-field effect, frequency selectivity, and a spatial broadband effect and a response matrix of an antenna array respectively: $\xi_{m,l,u,p}$ and $A_{m,l,u,p}(f)$ represent a large-scale fading factor of a $(p)^{th}$ transmission path between a $(l)^{th}$ metamaterial on a $(m)^{th}$ microstrip of a base station antenna and a user u and a channel gain coefficient respectively, $p_{u,p}$ and $P_{m,l}$ represent a scatterer position of the $(p)^{th}$ transmission path between the user u and the base station and a position of the $(l)^{th}$ metamaterial on the $(m)^{th}$ microstrip of the base station antenna respectively, $f$ and $f_c$ represent a frequency and a center frequency respectively, and c represents a signal transmission speed equal to $3 \times 10^8$;

Specifically, a specific expression of the channel gain coefficient is:

$$A_{m,l,u,p}(f) = |\Gamma_{u,p}(f)| \sqrt{F(\Theta_{m,l,u,p})} \frac{c}{4\pi(f+f_c)\|p_{u,p} - p_{m,l}\|_F} \quad (4)$$

in the expression (4), $\Theta_{m,l,u,p} = (\theta_{m,l,u,p}, \phi_{m,l,u,p})$ represents height-azimuth of a signal reflected from the user u by a $(p)^{th}$ reflector and reaching a $(l)^{th}$ antenna unit on the $(m)^{th}$ microstrip of the base station antenna, and a specific expression of $F(\Theta_{m,l,u,p})$ is:

$$F(\Theta_{m,l,u,p}) = \begin{cases} 6\cos^2(\theta_{m,l,u,p}), & \theta_{m,l,u,p} \in \left[0, \frac{\pi}{2}\right] \\ 0, & \text{otherwise} \end{cases} \quad (5)$$

$\Gamma_{u,p}(f)$ refers to a reflection coefficient of a reflector on a $(p)^{th}$ path of the user u, and a specific expression thereof is:

$$\Gamma_{u,p}(f) = \begin{cases} \dfrac{\cos\phi_{i,u,p} - n_t \cos\phi_{t,u,p}}{\cos\phi_{i,u,p} + n_t \cos\phi_{t,u,p}} e^{-\left(\frac{8\pi^2(f+f_c)^2 \sigma_{rough}^2 \cos^2\phi_{i,u,p}}{c^2}\right)}, & p = 1, 2, \ldots, P \\ 1, & p = 0 \end{cases} \quad (6)$$

in the expression (6), $n_t$ is a refractive index, $\sigma_{rough}^2$ is a roughness coefficient of a reflection surface, and $\cos\phi_{i,u,p}$ and $\cos\phi_{t,u,p}$ are an incident angle and a reflection angle of the signal of the user u on a $(p)^{th}$ reflection object respectively.

To sum up, the sum rate of the system may be expressed as:

$$R_S = \sum_{s=0}^{S-1} \Delta_B \log \left| \frac{P_t}{\Delta_B \sigma^2} W_s^H Q H_s G_s G_s^H H_s^H Q^H W_s \left( W_s^H Q H_s H_s^H Q^H W_s \right)^{-1} \right| \quad (7)$$

in the expression (7), S represents a quantity of subcarriers, and $\Delta_B$ represents a subcarrier spacing and is expressed as a ratio of a bandwidth B to the quantity of subcarriers S, that is, $$\Delta_B = \frac{B}{S}; I_U$$

is an identity matrix of $U \times U$, $\sigma^2$ is a variance of noise, $P_t$ represents a transmit power, and U is a quantity of users in a cell; $G_s = [g_{1,s}, g_{2,s}, \ldots, g_{U,s}] \in \mathbb{C}^{N_R \times U}$ represents a channel matrix of an $(s)^{th}$ subcarrier, $W_s \in \mathbb{C}^{M \times U}$ represents a baseband beamformer of the $(s)^{th}$ subcarrier, $H_s \in \mathbb{C}^{N_R \times N_R}$ describes a frequency-selective effect of a signal propagated on a microwave transmission band, and $Q \in \mathbb{C}^{M \times N_R}$ represents a weight matrix of a dynamic metasurface antenna; and log is a logarithm operation, and $|\cdot|$ is a matrix determinant obtaining operation.

Specifically, a baseband beamforming matrix and a weight matrix of a dynamic metasurface antenna are jointly designed, to maximize a near-field broadband large-scale MIMO uplink sum rate, and a specific expression of the foregoing first optimization problem is:

$$\mathcal{P}_1: \min_{Q, W_s, \forall s \in \{1, 2, \ldots, S\}} R_S \quad (8)$$

-continued $$\text{s.t. } (Q)_{m_1,(m_2-1)L+l} = \begin{cases} q_{m_1,l}, & m_1 = m_2 \\ 0, & m_1 \neq m_2 \end{cases},$$

$$q_{m_1,l} \in \mathbb{Q}, \forall m_1, l$$

In this problem, calculation complexity of the target function is very high, constraints are complex, and a plurality of target matrices need to be jointly optimized.

Therefore, this embodiment proposes a near-field broadband uplink MIMO transmission method assisted by a dynamic metasurface antenna, including methods such as MWMSE transformation, alternate optimization, matrix vectorization, and MM. Involved algorithms are described in detail below with reference to the foregoing optimization problem model.

(2) The first optimization problem in step (1) is equivalent to a mean square error sum minimization problem, the problem is defined as a second optimization problem, and then the second optimization problem is solved with the alternate optimization method where system sum rate maximization is used as a criterion, where when the second optimization problem is solved, a weighted auxiliary matrix is introduced based on an original variable to reduce complexity of transmission optimization; and the step (2) specifically includes:

the first optimization problem $\mathcal{P}_1$ posed in the step (1) is a typical sum rate maximization problem and is equivalent to a matrix-weighted mean square error sum minimization problem $\mathcal{P}_2$, the problem is defined as the second optimization problem $\mathcal{P}_2$ in this embodiment, and a specific expression thereof is:

$$\mathcal{P}_2: \min_{M_s,Q,W_s,\forall s \in \{1,2,...,S\}} \sum_{s=0}^{S-1} tr\{M_s E_s(Q, W_s)\} - \log_2|M_s| \quad (9a)$$

$$\text{s.t.}(Q)_{m_1,(m_2-1)L+l} = \begin{cases} q_{m_1,l}, & m_1 = m_2 \\ 0, & m_1 \neq m_2 \end{cases} \quad (9b)$$

$$q_{m_1,l} \in \mathbb{Q}, \forall m_1, l \quad (9c)$$

In the foregoing expression, $M_s$ is a weighted auxiliary matrix, and $E_s(Q,W_s)$ is a mean square error sum matrix, whose specific expression is:

$$E_s(Q, W_s) = \quad (10)$$
$$P_t(W_s^H QH_s G_s - I_U)(W_s^H QH_s G_s - I_U)^H + \Delta_B \sigma^2 W_s^H QH_s H_s^H Q^H W_s$$

Specifically, In this embodiment, the second optimization problem $\mathcal{P}_2$ is solved through alternate optimization, specifically including:

When Q and $W_s$ are given, where $\forall s \in \{1, 2, \ldots, S\}$, $M_s$ may be obtained from the following expression, where $\forall s \in \{1, 2, \ldots, S\}$:

$$M_s^{opt} = E_s(Q, W_s)^{-1} \quad (11)$$

When Q and $M_s$ are given, where $\forall s \in \{1, 2, \ldots, S\}$, $W_s$ may be given by the following expression, where $\forall s \in \{1, 2, \ldots, S\}$:

$$W_s^{opt} = (P_t QH_s G_s G_s^H H_s^H Q^H + \Delta_B \sigma^2 QH_s H_s^H Q^H)^{-1} QH_s G_s \quad (12)$$

When $W_s$ and $M_s$ are given, where $\forall s \in \{1, 2, \ldots, S\}$, Q may be obtained by solving a third optimization problem $\mathcal{P}_3$, and a specific expression of the third optimization problem $\mathcal{P}_3$ is:

$$\mathcal{P}_3: \sum_{s=0}^{S-1} tr\{P_t M_s W_s^H QH_s G_s G_s^H H_s^H Q^H W_s\} - tr\{P_t M_s W_s^H QH_s G_s\} - \quad (13a)$$
$$tr\{P_t M_s G_s^H H_s^H Q^H W_s\} + tr\{\Delta_B \sigma^2 M_s W_s^H QH_s H_s^H Q^H W_s\}$$

$$\text{s.t. } (Q)_{m_1,(m_2-1)L+1} = \begin{cases} q_{m_1,l}, & m_1 = m_2 \\ 0, & m_1 \neq m_2 \end{cases}, \quad (13b)$$

$$q_{m_1,l} \in \mathbb{Q}, \forall m_1, l \quad (13c)$$

The third optimization problem $\mathcal{P}_3$ is obtained by substituting $E_s(Q,W_s)$ into the second optimization problem $\mathcal{P}_2$, where $\forall s \in \{1, 2, \ldots, S\}$ and leaving out terms unrelated to Q.

Specifically, as shown in FIG. 2, this embodiment gives a flow of an algorithm of near-field broadband uplink transmission assisted by a dynamic metasurface antenna based on an alternate optimization method and with system sum rate maximization as a criterion, and a detailed process of the algorithm is as follows:

Step 1, initialize a baseband beamforming matrix $W_s^{(0)}$, where $\forall s \in \{1, 2, \ldots, S\}$, a weight matrix $Q_{(0)}$ of the dynamic metasurface antenna, a weighted auxiliary matrix $M_{(0)}$, and a system sum rate $R_s^{(0)}$, where a quantity of iteration times is $\ell_2 = 0$, and a threshold is $\xi_2$.

Step 2, give a weight matrix $Q^{(\ell_2)}$ of the dynamic metasurface antenna, and solve a baseband beamforming matrix $W_s^{(\ell_2+1)}$ according to the expression (12), where $\forall s \in \{1, 2, \ldots, S\}$.

Step 3, give $Q^{(\ell_2)}$ and the baseband beamforming matrix $W_s^{(\ell_2+1)}$, where $\forall s \in \{1, 2, \ldots, S\}$, and calculate a mean square error sum matrix $E_s(Q,W_s)^{(\ell_2+1)}$ according to the expression (10), where $\forall s \in \{1, 2, \ldots, S\}$.

Step 4, give the mean square error sum matrix $E_s(Q,W_s)^{(\ell_2+1)}$, where $\forall s \in \{1, 2, \ldots, S\}$, and solve a weighted auxiliary matrix $M_s^{(\ell_2+1)}$ according to the expression (11), where $\forall s \in \{1, 2, \ldots, S\}$.

Step 5, give $W_s^{(\ell_2+1)}$ and $M_s^{(\ell_2+1)}$, where $\forall s \in \{1, 2, \ldots, S\}$, and solve a problem $\mathcal{P}_3$ to obtain a weight matrix $Q^{(\ell_2+1)}$ of a dynamic metasurface antenna.

Step 6, calculate a system sum rate $R_S^{(\ell_2+1)}$, and if $|R_S^{(\ell_2+1)} - R_S^{(\ell_2)}| \leq \xi_2$ holds, jump out of the loop, and using ($W_s^{(\ell_2+1)}, Q^{(\ell_2+1)}$), where $\forall s \in \{1, 2, \ldots, S\}$, as a solution meeting the baseband beamforming matrix under the system sum rate maximization criterion and the weight matrix of the dynamic metasurface antenna: otherwise $\ell_2 = \ell_2 + 1$, and perform step 2 to step 6 again.

(3) Solve the weight matrix of the dynamic metasurface antenna based on the matrix vectorization method Specifically, in this embodiment, for the third optimization problem $\mathcal{P}_3$, the following method is taken:

For the block structure (13b) of the matrix Q, with the matrix vectorization method, a matrix tracing form in the target function is transformed into a vector multiplication form. Specifically, the matrix Q is pulled into $q=[q_{1,1}, q_{1,2}, \ldots, q_{m,(m-1)L+l}, \ldots, q_{M,ML}]^T$, where $q_{m,(m-1)L+l}$ represents an element of a $(m)^{th}$ row and a $(l)^{th}$ column of the matrix Q. Moreover, a matrix vectorization rule is used for obtaining:

$$tr\{QC_s\} = q^T c_s, \text{ and } tr\{Q^H C_s^H\} = c_s^H q \qquad (14a)$$

$$tr\{Q^H B_s Q A_s\} = q^H (B_s \otimes N_L) \odot A_s^T q \qquad (14b)$$

$$tr\{Q^H B_s Q D_s\} = q^H (B_s \otimes I_L) \odot D_s q \qquad (14c)$$

where $A_s = H_s G_s G_s^H H_s^H$, $B_s = W_s M_s W_s^H$, $C_s = H_s G_s M_s W_s^H$, and $D_s = H_s H_s^H$;

L represents a quantity of metasurface units on each microwave transmission band, $N_L$ is an all 1's matrix of L×L, $I_L$ is an identity matrix of L×L, $\tilde{B}_s$ is a diagonal matrix, and $(\tilde{B}_s)_{m,m} = (B_s)_{m,m}$; and $$c_s = [(C_s)_{1,1}, (C_s)_{2,1}, \ldots, (C_s)_{(m-1)L+l,m}, \ldots, (C_s)_{ML,M}]^T$$

The expression (14) is substituted into the target function of the problem $\mathcal{P}_3$, to obtain:

$$f(q) = \sum_{s=0}^{S-1} q^H [P_t(B_s \otimes N_L) \odot A_s^T + \Delta_B \sigma^2(\tilde{B}_s \otimes I_L) \odot D_s]q - 2\operatorname{Re}\{P_t q^H c_s^*\}$$

Therefore, a problem of optimizing a weight vector of the dynamic metasurface antenna to maximize the system sum rate may be expressed as:

$$\mathcal{P}_4: \min_q q^H S q - 2\operatorname{Re}\{q^H c^*\} \qquad (15a)$$

$$\text{s.t. } q_{m_1,l} \in \mathbb{Q}, \forall m_1, l \qquad (15b)$$

where $S = \sum_{s=0}^{S-1} P_t(B_s \otimes N_L) \odot A_s^T + \Delta_B \sigma^2(\tilde{B}_s \otimes I_L) \odot D_s$, $c = \sum_{s=0}^{S-1} P_t c_s$.

For the constraint (15b), four weight feasible domains are considered, are an unconstrained feasible domain, an amplitude feasible domain, a binary amplitude feasible domain and a Lorentzian constraint phase feasible domain respectively, and are specifically as follows:

a. For the unconstrained feasible domain, a problem of optimizing a weight vector of the dynamic metasurface antenna to maximize the system sum rate may be expressed as $\mathcal{P}_5$, whose specific expression is:

$$\mathcal{P}_5: \min_q q^H S q - 2\operatorname{Re}\{c^T q\} \qquad (16)$$

$\mathcal{P}_5$ is a convex problem, and can be solved with a conventional convex optimization method.

b. For the amplitude feasible domain, a problem of optimizing a weight vector of the dynamic metasurface antenna to maximize the system sum rate may be expressed as $\mathcal{P}_6$, whose specific expression is:

$$\mathcal{P}_6: \min_q q^T S q - 2\operatorname{Re}\{c^T\} q \qquad (17a)$$

$$\text{s.t. } q_{m_1,l} \in [a, b], b > a > 0, \forall m_1, l \qquad (17b)$$

Similarly, $\mathcal{P}_6$ is a convex problem, and can be solved with a conventional convex optimization method.

c. For the binary amplitude feasible domain, a problem of optimizing a weight vector of the dynamic metasurface antenna to maximize the system sum rate may be expressed as $\mathcal{P}_7$, whose specific expression is:

$$\mathcal{P}_7: \min_q q^T S q - 2\operatorname{Re}\{c^T\} q \qquad (18a)$$

$$\text{s.t. } q_{m_1,l} \in c \cdot \{0, 1\}, c > 0, \forall m_1, l \qquad (18b)$$

$\mathcal{P}_7$ can be solved with a brute-force search method.

d. For the Lorentzian constraint phase weight, a problem of optimizing a weight vector of the dynamic metasurface antenna to maximize the system sum rate may be expressed as $\mathcal{P}_8$, whose specific expression is:

$$\mathcal{P}_8: \min_q q^H S q - 2\operatorname{Re}\{c^T q\} \qquad (19a)$$

$$\text{s.t. } q_{m_1,l} \in \left\{ \frac{j + e^{j\phi}}{2} \middle| \phi \in [0, 2\pi] \right\}, \forall m_1, l \qquad (19b)$$

where $j$ represents an imaginary unit.

Specifically, in this embodiment, $\mathcal{P}_8$ can be solved with an MM method (an ordered convex optimization method), specifically including: First, a tractable valid upper bound is found, the problem $\mathcal{P}_8$ is replaced with a problem about an upper bound replacement function, and then a weight vector of a dynamic metasurface antenna is obtained with an alternate optimization method. An algorithm of solving a Lorentzian constraint phase weight with an MM method is described in detail below.

More specifically, the foregoing solving a Lorentzian constraint phase weight with an MM method specifically includes the following steps:

First, the weight vector of the dynamic metasurface antenna is expressed as $$q = \frac{1}{2}(j 1_{N_R} + p),$$

where $1_{N_R}$ is an all 1's vector, and $$p = [e^{j\phi_1}, e^{j\phi_2}, \ldots, e^{j\phi_{N_R}}]^T.$$

Therefore, the Lorentzian constraint phase is simplified into a modulo-1 constraint phase.

In this case, the expression (19a) may be written as:

$$f(p) = \frac{1}{4} p^H S p + \operatorname{Re}\left\{\frac{\mathcal{J}}{2} p^H S 1_{N_R} - p^H c^*\right\} + \operatorname{Re}\{\mathcal{J} 1_{N_R}^T c^*\} + \frac{1}{4} 1_{N_R}^T S 1_{N_R}$$

The function f(p) is a non-convex quadratic function about P, and with the MM method that is a sequential convex optimization method, a compact upper bounding function of f(p) may be obtained. First, a tractable compact upper bounding function is found and expressed as:

$$p^H S p \le p^H T p - 2\operatorname{Re}\{p^H(T-S)p^{(\ell)}\} + (p^{(\ell)})^H(T-S)p^{(\ell)} \quad (20)$$

$T = \lambda_{max} I$, $\lambda_{max}$ is a maximum eigenvalue of S, and the expression (20) is substituted into the problem $\mathcal{P}_8$ to obtain a problem $\mathcal{P}_9^{(\ell)}$, whose specific expression is:

$$\mathcal{P}_9^{(\ell)} \max_p \operatorname{Re}\{p^H a^{(\ell)}\} \quad (21a)$$

$$\text{s.t. } p_n \in \{e^{j\phi} \mid \phi \in [0, 2\pi]\}, \forall n \quad (21b)$$

where $\mathbf{a}^{(\ell)} = (\lambda_{max} \mathbf{I}_{N_R} - S)\mathbf{p}^{(\ell)} + 2c^* - j\mathbf{S}\mathbf{1}_{N_R}$. Additionally, in the target function of the problem $\mathcal{P}_9^{(\ell)}$, terms unrelated to the variable p are left out. The problem $\mathcal{P}_9^{(\ell)}$, can be solved by alternately optimizing the vectors a and p. Moreover, in each time of iteration, the vectors a and p may be obtained through a closed-form solution.

FIG. 3 gives a flow of an algorithm of solving a Lorentzian constraint phase weight based on an MM method, and a detailed process of the algorithm is specifically:

Step 1, initialize $\mathbf{p}^{(\ell_1)}$ and $\mathbf{a}^{(\ell_1)}$, and set an iteration index $\ell_1 = 0$ and a threshold $\xi_1$.

Step 2, give $\mathbf{a}^{(\ell_1)}$, and calculate $p_n^{(\ell_1+1)} = e^{j \arg a_n^{(\ell_1)}}$ and $\forall n$.

Step 3, give $\mathbf{p}^{(\ell_1+1)}$, and calculate $\mathbf{a}^{(\ell_1+1)} = (\lambda_{max} \mathbf{I}_{N_R} - S)\mathbf{p}^{(\ell_1+1)} + 2c^* - j\mathbf{S}\mathbf{1}_{N_R}$.

Step 4, calculate the system sum rate $R_S^{(\ell_1+1)}$, and if a difference between the $(\ell_1)^{th}$ system sum rate $R_S^{(\ell_1)}$ and the $(\ell_1+1)^{th}$ system sum rate $\mathbf{a}^{(\ell_1+1)}$ is less than the given threshold $\xi_1$, jump out of the loop, using $\mathbf{p}^{(\ell_1+1)}$ as a solution meeting the Lorentzian constraint phase weight under the system sum rate maximization criterion when the baseband beamforming matrix is given; otherwise $\ell_1 = \ell_1 + 1$, and perform steps 2 to 4 again.

As channel state information in a communication system is changed, the base station side dynamically implements, according to updated channel state information, near-field broadband large-scale MIMO uplink transmission assisted by a dynamic metasurface antenna with system sum rate maximization as a criterion, thereby dynamically updating transmission, to ensure transmission performance.

Any content not described in detail in the present invention is a technology publicly known by a person skilled in the art. The specific exemplary embodiments of the present invention are described in detail above. It should be understood that, a person of ordinary skill in the art may make many modifications and changes according to the idea of the present invention without creative effort. Therefore, any technical solution that may be obtained by a person skilled in the art through logic analysis, reasoning or limited experiments based on the existing technology according to the idea of the present invention should fall within the protection scope determining by the claims.

What is claimed is:

1. A near-field broadband uplink MIMO transmission method assisted by a dynamic metasurface antenna, wherein in the method, a sum rate maximization problem is constructed based on a broadband large-scale MIMO uplink single-cell system and a channel model that considers a near-field effect, frequency-selective fading, and a spatial broadband effect, wherein a dynamic metasurface antenna array is used on a base station side, and the sum rate maximization problem is solved in a manner of jointly designing a baseband beamforming matrix and a weight matrix of a dynamic metasurface antenna, to maximize a near-field broadband large-scale MIMO uplink sum rate; and the transmission method comprises:

step S1, giving a weight matrix of a dynamic metasurface antenna, and solving, based on matrix-weighted mean square error sum (MWMSE) transformation, a baseband beamforming matrix on each subcarrier according to a system sum rate maximization criterion;

step S2, giving a baseband beamforming matrix, and solving, based on matrix vectorization, minorization-maximization (MM) method, and a convex optimization method, a weight matrix of a dynamic metasurface antenna according to the system sum rate maximization criterion; and step S3, cyclically performing step S1 and step S2 until a difference between two adjacent system sum rates is less than a given threshold, wherein in a moving process of users, as state information of a channel from each user to the base station side is changed, the near-field broadband uplink MIMO transmission method assisted by a dynamic metasurface antenna is dynamically implemented.

2. The near-field broadband uplink MIMO transmission method assisted by a dynamic metasurface antenna according to claim 1, wherein a specific expression of the channel model that considers the near-field effect, the frequency-selective fading, and the spatial broadband effect is:

$$g_u(f) = \sum_{p=0}^{P_u} a_{u,p}(f) \odot b_{u,p}(f) \quad (1)$$

in the expression (1), $$a_{u,p}(f) = \left[ \sqrt{\xi_{1,1,u,p}} A_{1,1,u,p}(f), \sqrt{\xi_{1,2,u,p}} A_{1,2,u,p}(f), \ldots, \sqrt{\xi_{M,L,u,p}} A_{M,L,u,p}(f) \right] \quad (2)$$

$$b_{u,p}(f) = \left[ e^{-j2\pi(f+f_c)\frac{|p_{u,p}-p_{1,1}|}{2}}, e^{-j2\pi(f+f_c)\frac{|p_{u,p}-p_{1,2}|}{2}}, \ldots, e^{-j2\pi(f+f_c)\frac{|p_{u,p}-p_{M,L}|}{2}} \right] \quad (3)$$

wherein $a_{u,p}(f)$ and $b_{u,p}(f)$ represent a channel gain that considers a near-field effect, frequency selectivity, and a spatial broadband effect and a response matrix of an antenna array respectively; $\xi_{m,l,u,p}$ and $A_{m,l,u,p}(f)$ represent a large-scale fading factor of a $(p)^{th}$ transmission path between a $(l)^{th}$ metamaterial on a $(m)^{th}$ microstrip of a base station antenna and a user u and a channel gain coefficient respectively, $p_{u,p}$ and $p_{m,l}$ represent a scatterer position of the $(p)^{th}$ transmission path between the user u and the base station and a position of the $(l)^{th}$ metamaterial on the $(m)^{th}$ microstrip of the base station antenna respectively, $f$ and $f_c$ represent a frequency and a center frequency respectively, and C represents a signal transmission speed equal to $3\times10^8$;

the channel gain coefficient is expressed as:

$$A_{m,l,u,p}(f) = |\Gamma_{u,p}(f)|\sqrt{F(\Theta_{m,l,u,p})}\frac{c}{4\pi(f+f_c)\|p_{u,p}-p_{m,l}\|_F} \quad (4)$$

in the expression (4), $\Theta_{m,l,u,p}=(\theta_{m,l,u,p},\phi_{m,l,u,p})$ represents height-azimuth of a signal reflected from the user u by a $(p)^{th}$ reflector and reaching a $(l)^{th}$ antenna unit on the $(m)^{th}$ microstrip of the base station antenna, and $F(\Theta_{m,l,u,p})$ is expressed as:

$$F(\Theta_{m,l,u,p}) = \begin{cases} 6\cos^2(\theta_{m,l,u,p}), & \theta_{m,l,u,p} \in \left[0,\frac{\pi}{2}\right] \\ 0, & \text{otherwise} \end{cases} \quad (5)$$

$\Gamma_{u,p}(f)$ refers to a reflection coefficient of a reflector on a $(p)^{th}$ path of the user u, and is expressed as:

$$\Gamma_{u,p}(f) = \begin{cases} \frac{\cos\phi_{i,u,p} - n_t\cos\phi_{t,u,p}}{\cos\phi_{i,u,p} + n_t\cos\phi_{t,u,p}} e^{-\left(\frac{8\pi^2(f+f_c)^2\sigma_{rough}^2\cos^2\phi_{i,u,p}}{c^2}\right)}, & p=1,2,\dots,P \\ 1, & p=0 \end{cases} \quad (6)$$

in the expression (6), $n_t$ is a refractive index, $\sigma_{rough}^2$ is a roughness coefficient of a reflection surface, and $\cos\phi_{i,u,p}$ and $\cos\phi_{t,u,p}$ are an incident angle and a reflection angle of the signal of the user u on a $(p)^{th}$ reflection object respectively.

3. The near-field broadband uplink MIMO transmission method assisted by a dynamic metasurface antenna according to claim 2, wherein the sum rate maximization problem is defined as a first optimization problem, and a specific expression of the problem is:

$$P_1: \max_{Q,W_s,\forall s\in\{1,2,\dots,S\}} \sum_{s=0}^{S-1}\Delta_B\log\left|I_U + \frac{P_t}{\Delta_B\sigma^2}W_s^H QH_sG_sG_s^H H_s^H Q^H W_s\left(W_s^H QH_sH_s^H Q^H W_s\right)^{-1}\right| \quad (7)$$

$$\text{s.t. } (Q)_{m_1(m_2-1)L+l} = \begin{cases} q_{m_1,l}, & m_1 = m_2 \\ 0, & m_1 \ne m_2 \end{cases},$$

$$q_{m_1,l} \in \mathbb{Q}, \forall m_1, l$$

in the expression (7), a target function is a sum rate of a broadband large-scale MIMO uplink system based on a dynamic metasurface antenna, S represents a quantity of subcarriers, and $\Delta_B$ represents a subcarrier spacing and is expressed as a ratio of a bandwidth B to the quantity of subcarriers S; $I_U$ is an identity matrix of $U\times U$, $\sigma^2$ is a variance of noise, $P_t$ represents a transmit power, and U is a quantity of users in a cell; $G_s = g_{1,s}, g_{2,s}, K, g_{U,s}] \in \mathbb{L}^{N_R\times U}$ represents a channel matrix of an $(s)^{th}$ subcarrier, $W_s \in \mathbb{L}^{M\times U}$ represents a baseband beam-former of the $(s)^{th}$ subcarrier, $H_s \in \mathbb{L}^{N_R\times N_R}$ describes a frequency-selective effect of a signal propagated on a microwave transmission band, and $Q \in \mathbb{L}^{M\times N_R}$ represents a weight matrix of a dynamic metasurface antenna; and log is a logarithm operation, and $|\cdot|$ is a matrix determinant obtaining operation.

4. The near-field broadband uplink MIMO transmission method assisted by a dynamic metasurface antenna according to claim 3, wherein the step S1 specifically comprises:

step S101, obtaining an equivalent mean square error sum minimization problem of sum rate maximization with MWMSE transformation:

$$\min_{M_s,W_s,\forall s\in\{1,2,\dots,S\}} \sum_{s=0}^{S-1} tr\{M_s E_s(Q,W_s)\} - \log_2|M_s| \quad (8)$$

in the expression (8), $E_s(Q,W_s)$ is a mean square error sum matrix, whose specific expression is:

$$E_s(Q,W_s) = \quad (9)$$
$$P_t(W_s^H QH_sG_s - I_U)(W_s^H QH_sG_s - I_U)^H + \Delta_B\sigma^2 W_s^H QH_sH_s^H Q^H W_s$$

$M_s$ is a weighted auxiliary matrix and is obtained from an expression (10), whose expression is:

$$M_s^{opt} = E_s(Q,W_s)^{-1} \quad (10)$$

step S102, optimizing a baseband beamforming matrix on each subcarrier when a weight matrix of a dynamic metasurface antenna is given, to obtain a system sum rate optimization problem based on MWMSE transformation, wherein the problem is defined as a second optimization problem, and a specific expression of the second optimization problem is:

$$P_2: \min_{W_s,\forall s\in\{1,2,\dots,S\}} \sum_{s=0}^{S-1} tr\{M_s E_s(Q,W_s)\} - \log_2|M_s| \quad (11)$$

when $E_s(Q,W_s)$ and $M_s$ are given, $W_s$ is given by the following expression, wherein $\forall s \in \{1,2,K,S\}$:

$$W_s^{opt} = \left(P_t QH_sG_sG_s^H H_s^H Q^H + \Delta_B\sigma^2 QH_sH_s^H Q^H\right)^{-1} QH_sG_s \quad (12)$$

step S103, iteratively updating the mean square error sum matrix $E_s(Q,W_s)$, the weighted auxiliary matrix $M_s$, and the baseband beamforming matrix $W_s$, wherein $\forall s \in \{1, 2, K, S\}$, to obtain a baseband beamforming matrix meeting that a difference between adjacent two iteration results is less than a given threshold as a solution of a baseband beamforming matrix whose system sum rate is maximized when a weight matrix of a dynamic metasurface antenna is given.

5. The near-field broadband uplink MIMO transmission method assisted by a dynamic metasurface antenna according to claim 4, wherein the step S2 specifically comprises:

step S201, obtaining, when a baseband beamforming matrix is given, a problem of optimizing a weight matrix of a dynamic metasurface antenna to maximize a system sum rate, and obtaining an equivalent mean square error sum minimization problem with MWMSE transformation, wherein the problem is defined as a third optimization problem, whose specific expression is:

$$P_3: \min_Q \sum_{s=0}^{S-1} tr\{P_t M_s W_s^H Q H_s G_s G_s^H H_s^H Q^H W_s\} - tr\{P_t M_s W_s^H Q H_s G_s\} - \quad (13a)$$

$$tr\{P_t M_s G_s^H H_s^H Q^H W_s\} + tr\{\Delta_B \sigma^2 M_s W_s^H Q H_s H_s^H Q^H W_s\}$$

$$\text{s.t. } (Q)_{m_1,(m_2-1)L+l} = \begin{cases} q_{m_1,l}, & m_1 = m_2 \\ 0, & m_1 \neq m_2 \end{cases}, \quad (13b)$$

$$q_{m_1,l} \in \mathbb{Q}, \forall m_1, l \quad (13c)$$

step S202, removing a physical structure constraint of a dynamic metasurface antenna, that is, the expression (13b) with a matrix vectorization method, to obtain a problem of maximizing an equivalent expression of a system sum rate having only a weight feasible domain constraint of the dynamic metasurface antenna, wherein the problem is defined as a fourth optimization problem;

step S203, designing a weight of the dynamic metasurface antenna with an MM algorithm and a convex optimization algorithm in consideration of four weight feasible domain constraints; and step S204, iteratively updating the mean square error sum matrix $E_s(Q,W_s)$, the weighted auxiliary matrix $M_s$, and the weight matrix Q of the dynamic metasurface antenna, to obtain a weight matrix meeting that a difference between adjacent two iteration results is less than a given threshold as a solution of the weight matrix of the dynamic metasurface antenna whose system sum rate is maximized when a baseband beamforming matrix is given.

6. The near-field broadband uplink MIMO transmission method assisted by a dynamic metasurface antenna according to claim 5, wherein the step S202 specifically comprises:

step S2021, pulling the matrix Q into $q=[q_{1,1}, q_{1,2}, K, q_{m,(m-1)L+1}, K, q_{M,ML}]^T$, wherein $q_{m,(m-1)L+l}$ represents an element of a $(m)^{th}$ row and a $(l)^{th}$ column of the matrix Q;

step S2022, obtaining the following with a matrix vectorization rule:

$$tr\{QC_s\} = q^T c_s, \text{ and } tr\{Q^H C_s^H\} = c_s^H q \quad (14a)$$

$$tr\{Q^H B_s Q A_s\} = q^H (B_s \otimes N_L) \odot A_s^T q \quad (14b)$$

$$tr\{Q^H B_s Q D_s\} = q^H (\bar{B}_s \otimes I_L) \odot D_s q \quad (14c)$$

in the expressions (14a) to (14c), $A_s = H_s G_s G_s^H H_s^H$, $B_s = W_s M_s W_s^H$, $C_s = H_s G_s M_s W_s^H$, and $D_s = H_s H_s^H$; L represents a quantity of metasurface units on each microwave transmission band, $N_L$ is an all 1's matrix of L×L, $I_L$ is an identity matrix of L×L, $B_s$ is a diagonal matrix, and $(\bar{B}_s)_{m,m} = (B_s)_{m,m}$; and $$c_s = [(C_s)_{1,1}, (C_s)_{2,1}, K, (C_s)_{(m-1)L+l,m}, K, (C_s)_{ML,M}]^T; \text{ and}$$

step S2023, performing matrix vectorization transformation, wherein the fourth optimization problem is specifically expressed as:

$$P_4: \min_q q^H S q - 2 \operatorname{Re}\{q^H c^*\} \quad (15a)$$

$$\text{s.t. } q_{m_1,l} \in \mathbb{Q}, \forall m_1, l \quad (15b)$$

in the expression (15a), $$S = \sum_{s=0}^{S-1} P_t(B_s \otimes N_L) \odot A_s^T + \Delta_B \sigma^2 (\bar{B}_s \otimes I_L) \odot D_s, \quad c = \sum_{s=0}^{S-1} P_t c_s.$$

7. The near-field broadband uplink MIMO transmission method assisted by a dynamic metasurface antenna according to claim 6, wherein the step S203 specifically comprises:

step S2031, considering four weight feasible domain constraints, comprising: an unconstrained weight, an amplitude weight, a binary amplitude weight, and a Lorentzian constraint phase weight;

step S2032, for the unconstrained weight and the amplitude weight, expressing problems of optimizing a weight vector of the dynamic metasurface antenna to maximize the system sum rate as $P_5$ and $P_6$ respectively, wherein the problem $P_5$ and the problem $P_6$ are specifically expressed as:

$$P_5: \min_q q^H S q - 2\operatorname{Re}\{c^T q\} \quad (16)$$

$$P_6: \min_q q^T S q - 2\operatorname{Re}\{c^T\} q \quad (17a)$$

$$\text{s.t. } q_{m_1,l} \in [a,b], b > a > 0, \forall m_1, l \quad (17b)$$

wherein the problem $P_5$ and the problem $P_6$ are convex problems and solved through the convex optimization algorithm;

step S2033, for the binary amplitude weight, expressing a problem of optimizing a weight vector of the dynamic metasurface antenna to maximize the system sum rate as $P_7$, wherein the problem $P_7$ is specifically expressed as:

$$P_7: \min_q q^T S q - 2 \operatorname{Re}\{c^T\} q \quad (18a)$$

$$\text{s.t. } q_{m_1,l} \in c \cdot \{0,1\}, c > 0, \forall m_1, l \quad (18b)$$

wherein the problem $P_7$ is solved through a brute-force search method; and step S2034, for the Lorentzian constraint phase weight, expressing a problem of optimizing a weight vector of the dynamic metasurface antenna to maximize the system sum rate as $P_8$, wherein the problem $P_8$ is specifically expressed as:

$$P_8: \min_q q^H S q - 2 \operatorname{Re}\{c^T q\} \quad (19a)$$

$$\text{s.t. } q_{m_1,l} \in \left\{\frac{\mathcal{J} + e^{\mathcal{J}\phi}}{2} \,\middle|\, \phi \in [0, 2\pi]\right\}, \forall m_1, l \quad (19b)$$

wherein Ø represents an imaginary unit; and solving the problem $P_8$ through the MM algorithm.

8. The near-field broadband uplink MIMO transmission method assisted by a dynamic metasurface antenna according to claim 7, wherein the solving the problem $P_8$ through the MM algorithm specifically comprises the following steps:

step S20341, expressing the weight vector of the dynamic metasurface antenna as $$q = \frac{1}{2}(\mathcal{J}1_{N_R} + p),$$

wherein $1_{N_R}$ is an all 1's vector, and $$p = \left[e^{\mathcal{J}\phi_1}, e^{\mathcal{J}\phi_2}, \ldots, e^{\mathcal{J}\phi_{N_R}}\right]^T;$$

and step S20342, finding a tractable asymptotic function, whose expression is:

$$p^H S p \leq p^H T p - 2\operatorname{Re}\{p^H(T-S)p^{(\ell)}\} + (p^{(\ell)})^H(T-S)p^{(\ell)} \quad (20)$$

$T = \lambda_{max} I$, wherein $\lambda_{max}$ is a maximum eigenvalue of S; and therefore, the problem $P_8$ is transformed into:

$$P_9^{(\ell)} \max_p \operatorname{Re}\{p^H a^{(\ell)}\} \quad (21a)$$

$$\text{s.t. } p_n \in \{e^{\mathcal{J}\phi} \mid \phi \in [0, 2\pi]\}, \forall n \quad (21b)$$

wherein $a^{(1)} = (\lambda_{max} I_{N_R} - S)p^{(1)} + 2c^* - \emptyset S1_{N_R}$; and solving the problem $P_9^{(1)}$ by alternately optimizing the vectors a and p.

9. The near-field broadband uplink MIMO transmission method assisted by a dynamic metasurface antenna according to claim 8, wherein the solving the problem $P_9^{(1)}$ by alternately optimizing the vectors a and P specifically comprises:

first, initializing $p^{(1_1)}$ and $a^{(1_1)}$, and setting an iteration index $1_1=0$ and a threshold $\xi_1$;
then, giving $a^{(1_1)}$, and calculating $$p_n^{(1_1+1)} = e^{\emptyset \arg a_n^{(1_1)}}$$

and $\forall n$;

then, giving $p^{(1_1+1)}$, and calculating $a^{(1_1+1)} = (\lambda_{max} I_{N_R} - S)p^{(1_1+1)} + 2c^* - \emptyset S1_{n_R}$; and finally, calculating the system sum rate $R_S^{(1_1+1)}$, and if a difference between the $(1_1)^{th}$ system sum rate $R_S^{(1_1)}$, and the $(1_1+1)^{th}$ system sum rate $R_S^{(1_1+1)}$ is less than the given threshold $\xi_1$, jumping out of the loop, using $p^{(1_1+1)}$ as a solution meeting the Lorentzian constraint phase weight under the system sum rate maximization criterion when the baseband beamforming matrix is given; otherwise $1_1=1_1+1$, and performing the previous three steps again.

10. The near-field broadband uplink MIMO transmission method assisted by a dynamic metasurface antenna according to claim 9, wherein the step S3 specifically comprises:

step S301, initializing a baseband beamforming matrix $W_s^{(0)}$, wherein $\forall s \in \{1, 2, K, S\}$, a weight matrix $Q^{(0)}$ of the dynamic metasurface antenna, a weighted auxiliary matrix $M^{(0)}$, and a system sum rate $R_S^{(0)}$, wherein a quantity of iteration times is $1_2=0$, and a threshold is $\xi_2$;

step S302, giving a weight matrix $Q^{(1_2)}$ of the dynamic metasurface antenna, and solving a baseband beamforming matrix $W_s^{(1_2+1)}$ according to the expression (12), wherein $\forall s \in \{1, 2, K, S\}$;

step S303, giving $Q^{(1_2)}$ and the baseband beamforming matrix $W_s^{(1_2+1)}$, wherein $\forall s \in \{1, 2, K, S\}$, and calculating a mean square error sum matrix $E_s(Q, W_s)^{(1_2+1)}$ according to the expression (9), wherein $s \in \{1, 2, K, S\}$;

step S304, giving the mean square error sum matrix $E_s(Q, W_s)^{(1_2+1)}$, wherein $\forall s \in \{1, 2, K, S\}$, and calculating a weighted auxiliary matrix $M_s^{(1_2+1)}$ according to the expression (10), wherein $\forall s \in \{1, 2, K, S\}$;

step S305, giving $W_s^{(1_2+1)}$ and $M_s^{(1_2+1)}$, wherein $\forall s \in \{1, 2, K, S\}$, and solving weight matrices $Q^{(1_2+1)}$ of four dynamic metasurface antennas according to the expressions (16) to (21) respectively; and step S306, calculating a system sum rate $R_s^{(1_2+1)}$, and if $|R_s^{(1_2+1)} - R_s^{(1_2)}| \leq \xi_2$ holds, jumping out of the loop, and using $(W_s^{(1_2+1)}, Q^{(1_2+1)}$, wherein $\forall s \in \{1, 2, K, S\}$, as a solution meeting the baseband beamforming matrix under the system sum rate maximization criterion and the weight matrix of the dynamic metasurface antenna; otherwise $1_2=1_2+1$, and performing step S302 to step S306 again.

* * * * *